Aug. 28, 1945.                    W. J. S. JOHNSON                    2,383,655
                                  JIG BORING MACHINE
                                  Filed Jan. 11, 1941                 3 Sheets-Sheet 3
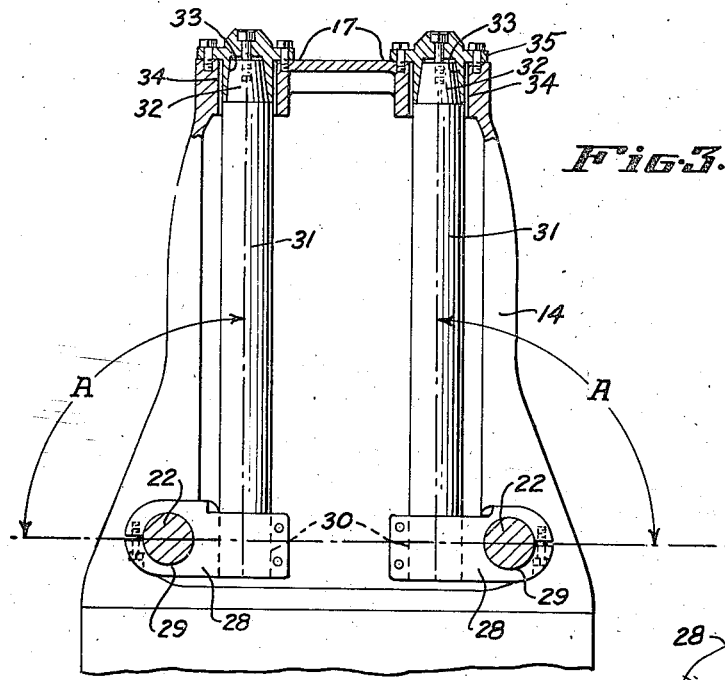
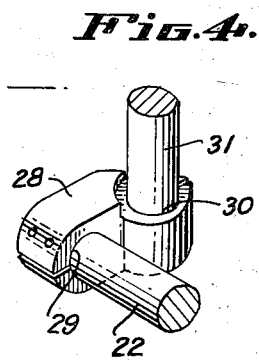
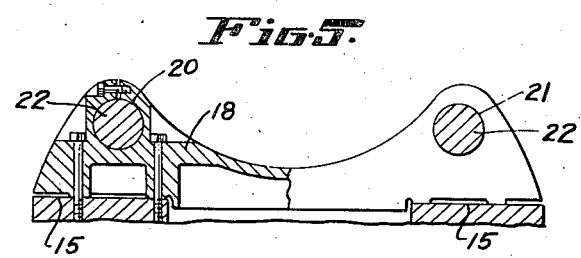
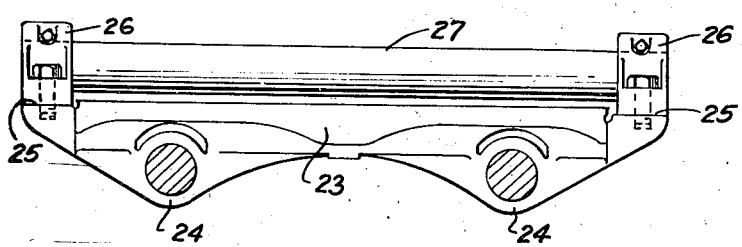
INVENTOR.
WALLACE J. S. JOHNSON
BY
Oscar A. Mellin
ATTORNEY.

Patented Aug. 28, 1945

2,383,655

UNITED STATES PATENT OFFICE 2,383,655

JIG BORING MACHINE

Wallace J. S. Johnson, Berkeley, Calif., assignor, by mesne assignments, to Kearney & Trecker Products Corporation, Milwaukee, Wis., a corporation Application January 11, 1941, Serial No. 374,043

2 Claims. (Cl. 77—1)

This invention relates to machine tools and particularly pertains to jig boring machines.

In general, machines of the character with which the present invention is concerned include a rigid main frame having main ways and rotary table ways arranged perpendicularly to the main ways. Also, cross carriage ways are provided which are mounted in a plane parallel to the plane of the main ways, but which extend at right angles to the main ways to traverse therealong toward and away from the rotary table ways. It is essential to accurate operation that the travel of the rotary table along its ways be exactly perpendicular to the plane of the main ways and also that the travel of the cross carriage be in a plane exactly parallel to the plane of the main ways and in a direction exactly ninety degrees to the plane of extension thereof. Such a machine is described and illustrated in detail in my copending application entitled "Precision boring machine," filed October 26, 1940, Ser. No. 362,920, now Patent 2,341,383, issued February 8, 1944.

In jig boring machines and machine tools of like character it is, of course, absolutely essential for accurate work that the planes of operation of the machine be relatively determined with extreme precision. Such precision can be attained in machine tools heretofore produced only by very skilled and experienced mechanics by a long and tedious process, which results not only in a high cost of production but in relatively low production of a given plant capacity.

It is the principal object of my present invention to make it possible to produce a machine tool of greater accuracy of alignment than has heretofore been produced and to reduce the cost of producing such machine tools by reducing the man hours necessary to construct the same by providing a novel construction for machine tools which enables the ways of the same to be produced and assembled in such machines in accurate co-relationship by comparatively rapid production methods requiring a minimum of hand labor but insuring absolute precision in determining the relative planes of operation of the elements of the machine.

One form which the invention may assume is exemplified in the following description and illustrated by way of example in the accompanying drawings, in which:

Fig. 3 is a fragmentary view in vertical section showing the mounting of the rotary table ways and their relationship to the main ways.

Fig. 4 is a fragmentary view in perspective showing the right angle bracket connection between the main and the rotary table ways.

Fig. 5 is a fragmentary view in transverse section showing the mounting of the main ways on the main frame.

Fig. 6 is a transverse sectional view showing the manner in which the carriage is mounted on the main ways.

Figure 1:
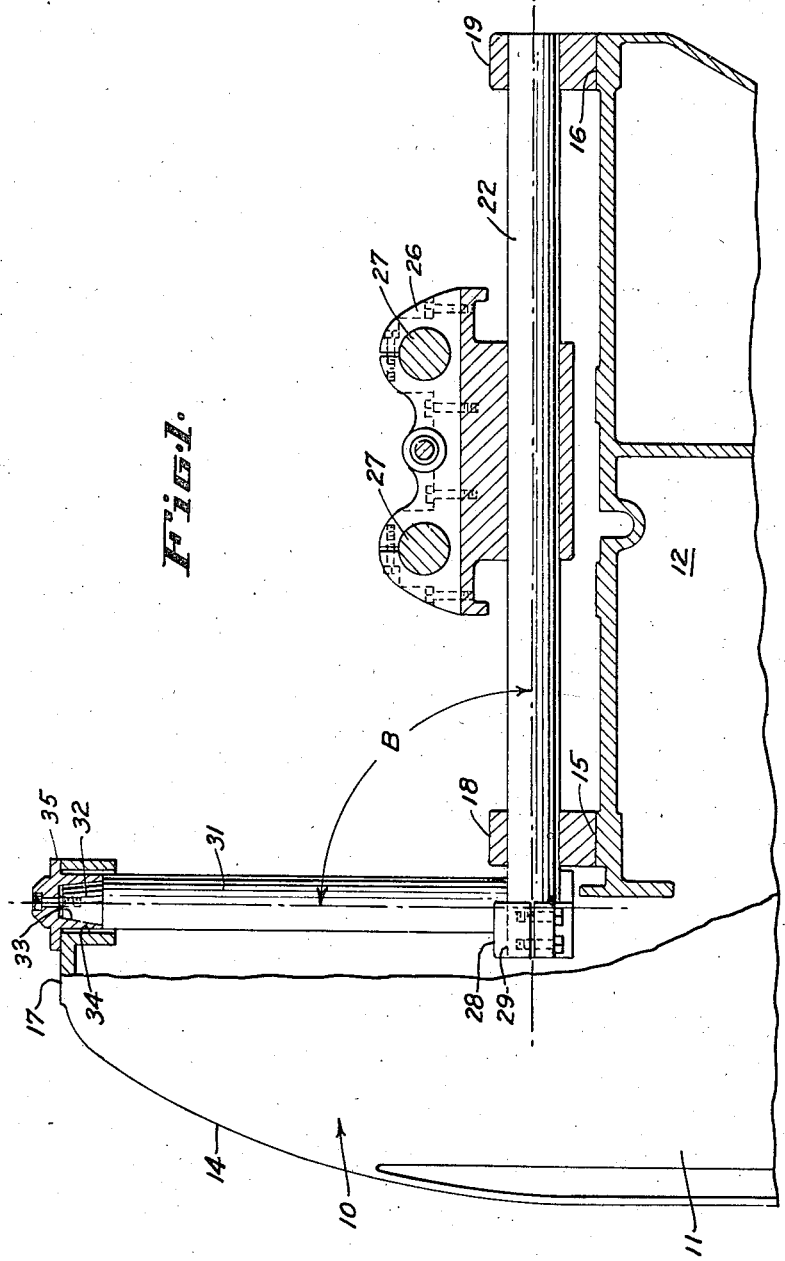
Fig. 1 is a fragmentary view in side elevation and in longitudinal section of a machine embodying my invention, shown in skeleton form for the purpose of best illustration.
Figure 2:
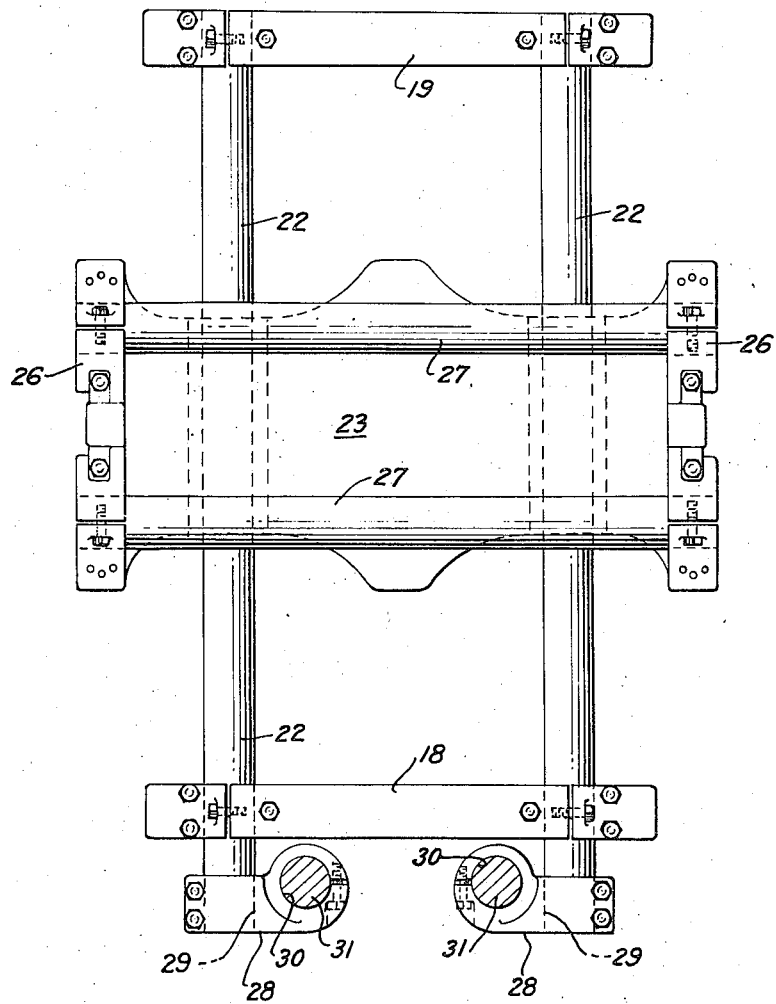
Fig. 2 is a plan view in skeleton form showing the ways in their relative positions.

Referring more particularly to the accompanying drawings, 10 indicates a jig boring machine of the type with which the present invention is concerned. It is to be understood, however, that the invention is applicable to other machines of the same general character and not limited to the precise type of machine here referred to. In the present application I only illustrate and describe the parts of the machine and their operation essential to the understanding of the invention for reasons of simplicity and brevity.

The machine 10 is provided with a rigid frame 11 which includes a horizontal bed 12 and a hollow vertical column 14 which are extremely rigid in construction. The bed 12 has machined surfaces 15 and 16 and the column 14 has a machined surface 17, all of which are planed at the same set up so that the surfaces 15 and 16 will be in the same plane and the surface 17 will be in an exact parallel plane.

Two main bearing members 18 and 19 are provided, each of which is formed with two spaced parallel bores 20 and 21 to receive cylindrical main way bars 22. The two bearing members 18 and 19 are bored at the same time and their bottom surfaces are machined at the same time and at the same set up so as to insure absolute accuracy in relative alignment of the main way bars 22. The main bearing members 18 and 19 are mounted and secured on the finished surfaces 15 and 16 as illustrated with the way bars 22 lying in exactly the same plane and in exact parallelism therewith.

A carriage 23 is provided which is formed with two bearings 24 accurately bored in exact parallelism to receive the main way bars 22. The spacing of the bores in the bearings 24 is, of course, accurately located to enable the carriage to traverse the main way bars 22.

The carriage 23 as herein illustrated has two machined and finished surfaces 25 which lie in the same plane, which plane is exactly parallel to the plane of the main way bars 22. Mounted on the finished surfaces 25 are cross carriage bearings 26 which are machined and bored at the same time so as to receive cross carriage way bars 27 and maintain the same in exact parallelism and in the same plane. It will be noticed that the cross carriage way bars 27 are arranged at right angles to the main way bars 22, but it should be also pointed out that they lie in a plane exactly parallel to that of the main way bars 22.

In order to enable the cross carriage way bars 27 to be disposed exactly at ninety degrees to the way bars 22, the bearings 26 may be arranged on the finished surfaces 25 and the angle exactly measured by instruments, and when the bearings are in their correct positions, they may be bolted and then doweled to the carriage 23.

It will be understood that the function of the structure just described is to provide, for a support (not shown) slidable on way bars 27, both longitudinal movement in a direction parallel to the axes of way bars 22 and cross movement in a direction parallel to the axes of way bars 27, the two support movements in this instance being at right angles to each other. To effect accuracy the way bars must be accurately positioned by rigid interconnecting structure, but not necessarily by the exact structure and method described for purposes of illustration. The parts 23, 26 might be integrally formed, for example, with the various bores which receive the way bars accurately positioned by suitable boring operations.

It will be noticed that the main way bars 22 extend slightly into the hollow column 14 of the machine. At this end each way bar is fitted with a right angular bracket 28. Each bracket is provided with a bore 29 to receive the main way bar 22 and with an offset bore 30 to receive the lower end of the adjacent rotary table way bar 31. The axes of the offset bores of the right angular brackets 28 are respectively in different mutually perpendicular planes and the brackets are split adjacent each bore for clamping purposes after placing in position on the way bars.

It is seen from the drawings that it is the lower ends of the rotary table way bars which are fitted to the right angular brackets 28. The upper ends of these way bars are tapered as at 32 and fitted into tapered sockets in end bearing members 33. These end bearing members very loosely fit in bores 34 in the upper end of the column 14, which bores extend downwardly through the finished or machined surface 17 of the upper end of the column. The bearing members 33 are each formed with a circumscribing flange 35 properly faced to bear on the finished or machined surface 17. The flanges 35 of the bearings 33 are cap-screwed or otherwise secured to the column and subsequently doweled in place with the angles A and B precisely 90°.

It is seen from the foregoing that by means of my present invention I am enabled to insure that the operation of the rotary table mounted on the rotary table ways 31 will be exactly perpendicular to the plane of the main ways 22, which, of course, is the plane of operation of the main carriage toward and away from the rotary table. Also, I insure that the operation of the cross carriage will be in a plane exactly parallel to the plane of the main carriage and exactly at right angles thereto.

The essential feature here is the ability to accomplish such extreme precision with a minimum of hand labor and by production methods rather than by hand fitting methods. Thus, the production of machines of this character can be accomplished at greater rapidity than by former methods with the same plant capacity and same number of man hours.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a machine of the character described, a main frame comprising a horizontal portion and a vertical portion at one end thereof, a pair of main way bars fixed on the horizontal portion in parallelism and in the same plane, a pair of right angle brackets, each bracket having a bore to receive one of the main way bars and a bore at right angles thereto, a pair of vertical way bars, the lower ends of which being received in the bores of said brackets to extend perpendicularly to the plane of the main way bars, the vertical portion of said frame having a horizontal section formed with two vertical apertures in alignment with the bores of the brackets in which said vertical way bars are projected, an end bearing at the upper end of each way bar received in the apertures of the horizontal section of the vertical portion and capable of transverse movement therein whereby the axes of the vertical way bars may be angularly adjusted relative to the plane of the main way bars, said end bearings being capable of being secured to the frame when said vertical way bars are in adjusted position.

2. In a machine of the character described, a main frame having a pair of machined surfaces lying in the same plane, a bearing member mounted on each surface and secured to the frame, said bearing members being formed with identically spaced parallel bores, a first pair of way bars extending between the bearing members and secured in said bores and lying in the same plane, a second pair of way bars extending perpendicularly to the first, right angle bracket connections between the ends of the bars of the second pair and the bars of the first pair enabling the axes of the bars of the second pair to be adjusted angularly relative to the plane of the first pair, an end bearing at the other end of each of the second pair of way bars, said main frame being formed with apertures which said end bearings loosely fit, and means for securing said bearings to said frame with the bars of the second pair in adjusted position.

WALLACE J. S. JOHNSON.